United States Patent [19]

Mischke et al.

[11] Patent Number: 4,756,292
[45] Date of Patent: Jul. 12, 1988

[54] METHOD FOR ADJUSTING THE START OF A PUMP DELIVERY IN A TIMING DEVICE OF AN INJECTION PUMP OF AN AIR-COMPRESSING INTERNAL COMBUSTION ENGINE

[75] Inventors: Arthur Mischke, Ostfildern; Wilhelm Wagner, Stuttgart; Friedrich Scherer, Unterensingen, all of Fed. Rep. of Germany

[73] Assignee: Daimler-Benz Aktiengesellschaft, Stuttgart, Fed. Rep. of Germany

[21] Appl. No.: 931,071

[22] Filed: Nov. 17, 1986

[30] Foreign Application Priority Data

Nov. 16, 1985 [DE] Fed. Rep. of Germany ....... 3540813

[51] Int. Cl.⁴ ............................................. F02M 37/04
[52] U.S. Cl. ..................................... 123/501; 123/478
[58] Field of Search ............... 123/500, 501, 502, 357, 123/478, 486, 487

[56] References Cited

U.S. PATENT DOCUMENTS 4,367,716  1/1983  Yasuhara ............................. 123/501

FOREIGN PATENT DOCUMENTS 3151889  7/1983  Fed. Rep. of Germany.

Primary Examiner—Henry A. Bennett
Attorney, Agent, or Firm—Barnes & Thornburg

[57] ABSTRACT

For adjusting the beginning of the pump delivery in a timing device of an injection pump of an air-compressing internal combustion engine for the drive of a vehicle, the beginning of pump delivery belonging to the load condition is determined and adjusted by means of an electric control unit on the basis of the operating parameters internal combustion engine rotational speed, control rack displacement and crankshaft position signal. For reducing the noise emission of the internal combustion engine, in case of a change from an internal combustion engine load which exists over a predetermined time period, from a lower load range into an upper load range, the beginning of the pump delivery is initially adjusted by the control unit in the direction of retard and subsequently the beginning of the pump delivery coordinated to the changed load condition is caused to follow-up with time delay.

14 Claims, 3 Drawing Sheets

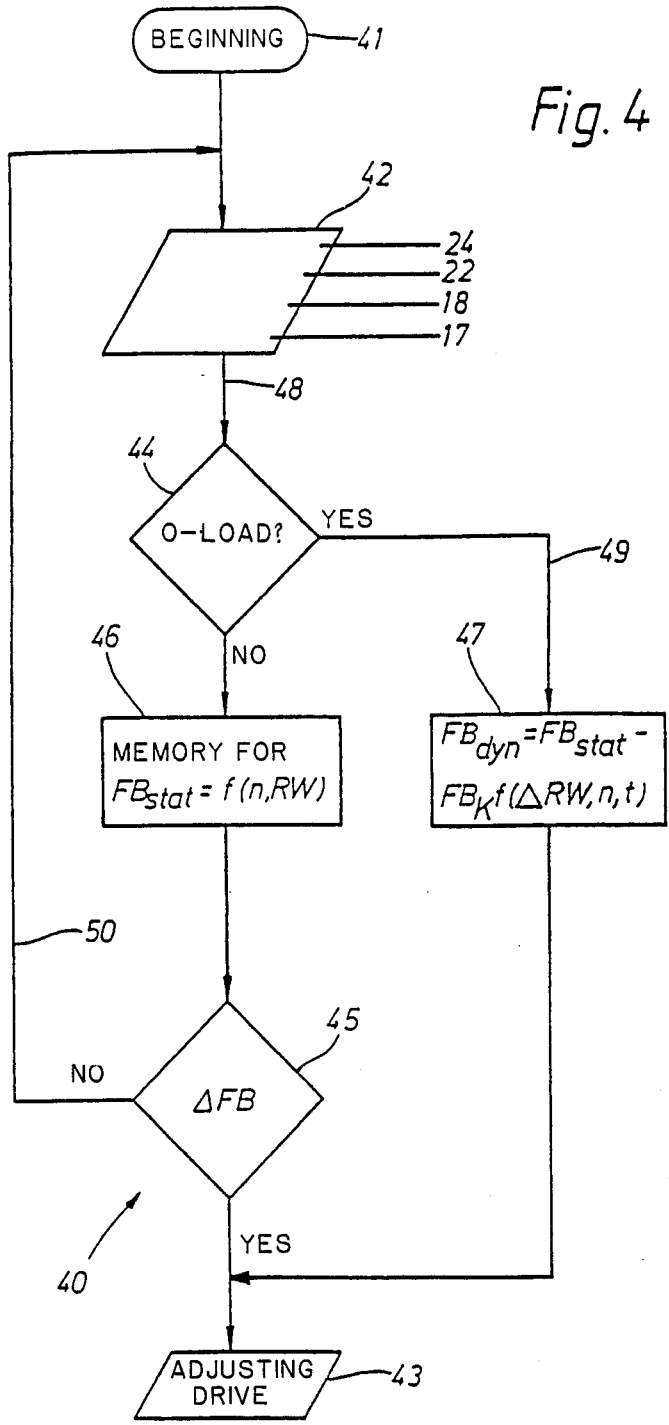

METHOD FOR ADJUSTING THE START OF A PUMP DELIVERY IN A TIMING DEVICE OF AN INJECTION PUMP OF AN AIR-COMPRESSING INTERNAL COMBUSTION ENGINE

The present invention relates to a method and apparatus for adjusting the start of pump delivery in a timing device of an injection pump of an air-compressing internal combustion engine by means of an electronic control unit which adjusts the start of pump delivery in the direction of "advance" or "retard" as a function of the load condition of the internal combustion engine determined from the operating parameters of internal combustion engine rotational speed, control rack displacement and crankshaft position signal.

A fuel injection system in an internal combustion engine is disclosed in the German Patent 31 51 889 which is adapted to be influenced by a control unit including a microprocessor. The temperature of the charging air, the ignition pressure and the internal combustion engine rotational speed are supplied to the control unit as influencing factors of the internal combustion engine. On the basis of these factors, a possible retard of the start of pump delivery can be determined. By an actuation of a three/two-directional control valve, the fuel to be fed to the internal combustion engine is adapted to be introduced into a fuel accumulator, by means of which a time retardation of the start of the pump delivery can be realized. However, this prior publication provides no indication as regards the characteristics and the use of the adjustment of the start of pump delivery.

It is an object of the present invention to decrease the noise emission of an internal combustion engine during the non-steady condition by influencing the combustion processes. The underlying problems are solved according to the present invention in that with a change of an internal combustion load which exists over a predetermined period of times from a lower load range to an upper load range, the beginning of the pump delivery is initially adjusted by the control unit in the direction of retard and subsequently is followed up with time delay to a commencement of pump delivery coordinated to the changed load condition.

The method and apparatus of the present invention entails the advantage that by influencing the fuel injection system during the non-steady operation of the internal combustion engine, an increase of the noise emission can be avoided. Thus, an encapsulation surrounding the internal combustion engine for damping the noise emission can be provided with smaller wall thickness without deteriorating the emission. Therebeyond, the noise encapsulation experiences a weight reduction which is an aim in all areas with the present-day light weight construction of motor vehicles.

These and other objects, features and advantages of the present invention will become more apparent from the following description when taken in connection with the accompanying drawing which shows, for purposes of illustration only, one embodiment in accordance with the present invention, and wherein:

FIG. 4 is a flow chart according to which the microprocessor of the control unit determines an adjustment of the beginning of pump delivery.

Figure 1:
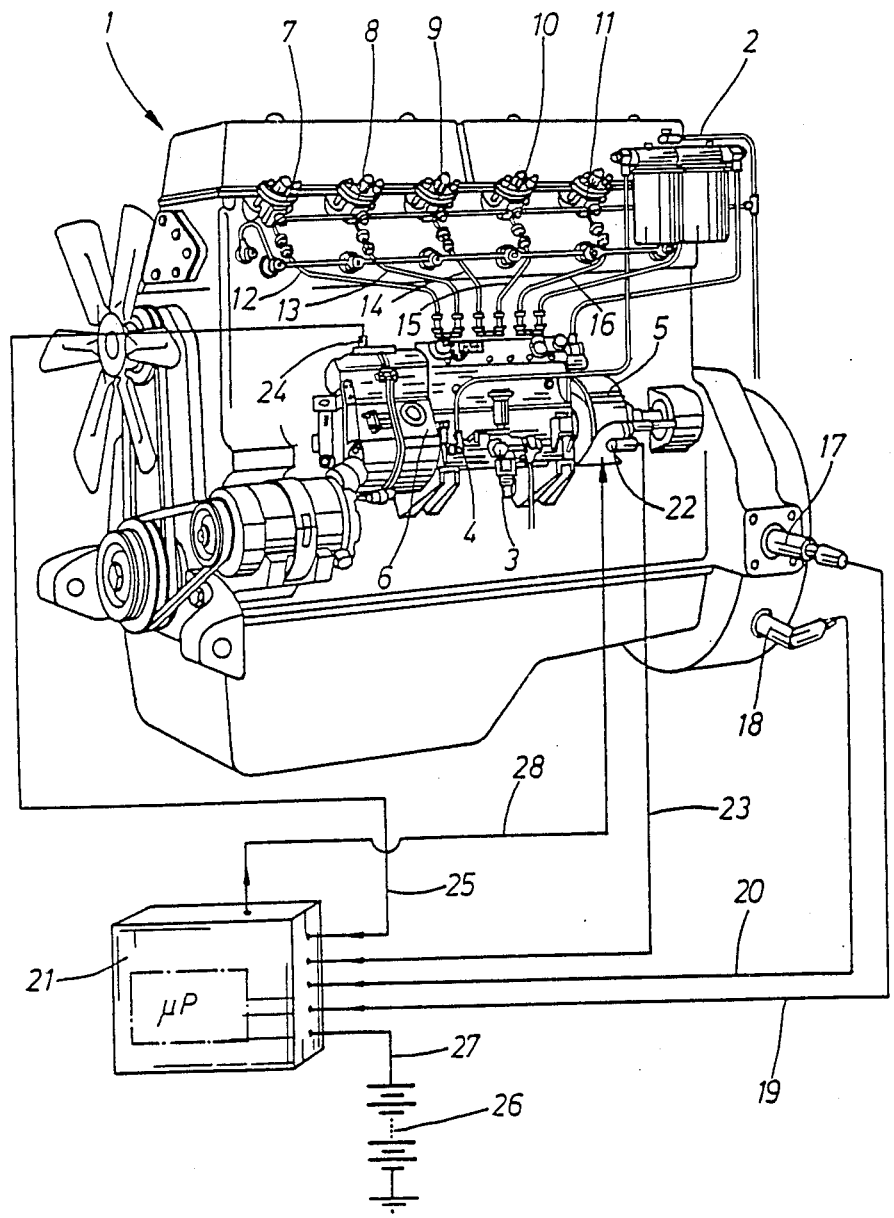
FIG. 1 is a somewhat schematic perspective view of an auto-igniting internal combustion engine with auxiliary aggregates and with a control unit including a microprocessor in accordance with the present invention.

Referring now to the drawing, and more particularly to FIG. 1, reference numeral 1 generally designates in this figure an internal combustion engine which includes a fuel filter 2, a fuel feed pump 3, an injection pump 4, a timing device 5 and a regulator or governor 6. Injection nozzles 7-11 are coordinated to the combustion spaces (not shown) of the internal combustion engine 1 which are operatively connected with the injection pump 4 by way of fuel lines 12-16. An upper dead-center position measuring sensor 17 and a measuring sensor 18 determining the crankshaft rotational speed are coordinated to the crankshaft (not shown) of the internal combustion engine 1. The measuring sensor 17 is operatively connected with a control unit 21 by way of a signal-transmitting line 19 and the measuring sensor 18 is operatively connected with the control unit 21 by way of a signal-transmitting line 20. The control unit 21 includes a conventional microprocessor. The beginning of the pump delivery can be detected by means of a measuring sensor 22 coordinated to the timing device 5. A signal-transmitting line 23 connects the measuring sensor 22 with the control unit 21. The control rack displacement can be detected by means of a measuring sensor 24 coordinated to the regulator or governor 6. A signal-transmitting line 25 connects the measuring sensor 24 with the control unit 21. A line 27 connects the control unit 21 with a voltage source 26. An adjusting drive (not shown) which is actuatable by an auxiliary force and is coordinated to the timing device 5, is operatively connected with the control unit 21 by way of a control line 28.

Figure 2:
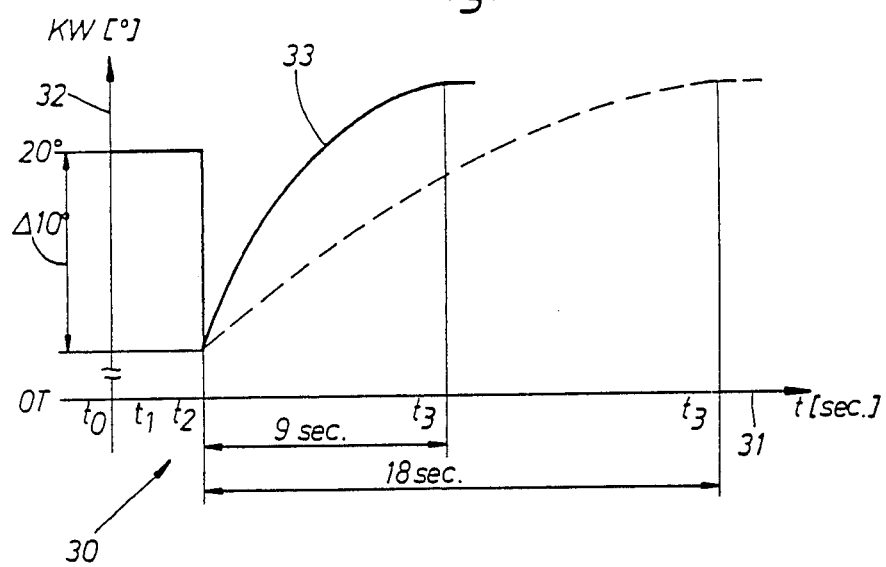
FIG. 2 is a diagram schematically illustrating the curve of the beginning of the pump delivery.

A curve of the adjusting angle of the beginning of the pump, delivery is schematically illustrated in the diagram of FIG. 2. The graphic illustration of the function takes place in a Cartesian coordinate system 30. The time in seconds is plotted along the abscissa 31 and the adjusting angle of the beginning of the pump delivery is plotted along the ordinate 32 in crankshaft degrees (kw°) At the instant $t_0$, an adjusting angle of the pump delivery beginning of 20° KW is adjusted. At the instant $t_1$, an acceleration initiation takes place. The beginning of the pump delivery is adjusted through 10° KW in the direction of "retard". During a correcting period of time $t_2$–$t_3$ of 9 seconds, a follow-up of the adjustment of the pump delivery beginning takes place. At the instant of time $t_3$ the shape of the curve 33, by means of which the follow-up takes place, reaches a static adjusting angle of the pump delivery beginning which will be utilized on the basis of the adjusted rotational speed. The function describing the curve 33 includes an exponential portion $\exp -t/\tau$, with a time constant $\tau$ which assumes one-third of the value of the value of the time interval $t_2$–$t_3$, and where t is the instantaneous value of the time interval $t_2$–$t_3$. According to a further construction of the present invention, the correcting time period $t_2$–$t_3$ may also be 18 seconds long. The duration for the correcting time period $t_2$–$t_3$ amounts to about two seconds for internal combustion engines with small combustion spaces. With increasing combustion space size, the correcting time period $t_2$–$t_3$ extends to a duration of about 30 seconds.

Figure 3:
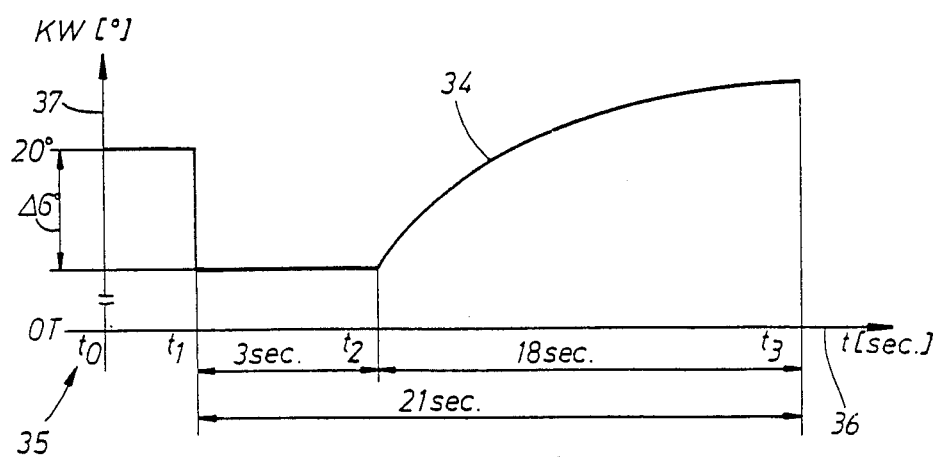
FIG. 3 is a diagram schematically illustrating the beginning of the pump delivery subdivided into two ranges.

In FIG. 3, a curve of the adjusting angle of the pump delivery beginning subdivided into two ranges is schematically illustrated in a diagram. The graphic illustration of the curve 34 takes place again in a Cartesian coordinate system 35. The time is plotted in seconds along the abscissa 36 and the adjusting angle of the pump delivery beginning in crankshaft degrees (kw°) is plotted along the ordinate 37. At the instant of time $t_0$ an adjusting angle of the pump delivery beginning, for example, of 20° KW is adjusted. At the instant $t_1$ an acceleration initiation takes place. The pump delivery beginning is adjusted in the direction "retard" by 6° crankshaft angle. This full adjustment is maintained for about 3 seconds up to the instant $t_2$. From the instant $t_2$ to the instant $t_3$, a follow-up of the adjusting angle of the pump delivery beginning takes place starting from the full adjustment. The follow-up takes place according to a function with an exponential component $\exp -t/\tau$ with $\tau$ as time constant which assumes one-third of the value of the time interval $t_2-t_3$ and where t is the instantaneous value of the time interval $t_2-t_3$. After the lapse of the time interval $t_2-t_3$ of 18 seconds, the curve 34 reaches at the instant $t_3$ the static adjusting angle of the pump delivery beginning which will be utilized on the basis of the adjusted rotational speed. The time interval $t_1-t_3$ amounts to 21 seconds, with the first time section which lasts for three seconds, having a constant pump delivery beginning adjusted in the direction of "retard" and with a second time section $t_2-t_3$ lasting 18 seconds.

A flow chart 40, according to FIG. 4, includes a terminal 41, an input block 42, an output block 43, branching blocks 44 and 45 and operation blocks 46 and 47 which are connected with flow lines 48–50. The factors detected by the measuring sensors 17, 18, 22 and 24 and influencing the operation of the internal combustion engine are fed to the input block 42. It can be determined on the basis of the data whether the desired power output of the internal combustion engine is larger than the instantaneous output produced by the internal combustion engine. In the branching block 44 will be examined whether a load change from a lower load range into an upper load range is present. With a load change from the lower load range to the upper load range, a branching to the operation block 47 takes place otherwise to the operation block 46. The output signal of the operation block 46 is a static adjusting angle of the pump delivery beginning read out from a performance graph memory which can be read out from the performance graph memory as function of the crankshaft rotational speed of the internal combustion engine and of the control rack displacement and is fed to the branching block 45. The instantaneously adjusted adjusting angle of the pump delivery beginning is compared in the branching block 45 with the instantaneous adjusting angle of the pump delivery beginning fed from the operation block 46. If a deviation from the instantaneously adjusted adjusting angle of pump delivery beginning to the adjusting angle of the pump delivery beginning instantaneously fed from the operation block 46 exists, then a branching takes place to the output block 43 which activates the adjusting drive corresponding to the adjusting angle of the pump delivery beginning to be adjusted. If the adjusting angles of the pump delivery beginning are identical, then a branching to the input block 42 takes place.

With a branching from the branching block 44 to the operation block 47, a dynamic adjusting angle of the pump delivery beginning is determined in the latter.

For that purpose, a static adjusting angle of the pump delivery beginning as a function of the crankshaft rotational speed of the internal combustion engine and of the control rack displacement is read out of the performance graph memory. A correcting adjusting angle of the pump delivery beginning readable out of a read-only memory (ROM) in dependence on the control rack displacement change and the crankshaft rotational speed is subtracted from the static adjusting angle of the pump delivery beginning. The thus-determined dynamic adjusting angle of the pump delivery beginning is fed by way of the branching place 45 to the output block 43 for the adjusting drive. With the read-out of the correcting adjusting angle from the ROM, one obtains therebeyond additionally the information concerning the time duration of the correcting period of time for the dynamic adjustment of the pump delivery beginning. The follow-up of the correcting adjusting angle of the pump beginning takes place according to the function $FB_{K(t)} = FB_K \cdot \exp -t/\tau$ wherein $FB_{K(t)}$ is the adjusting angle of the pump delivery beginning to be adjusted in degrees of crankshaft angle $FB_K$ is the correcting adjusting angle of the pump delivery beginning in degree crankshaft angle $\tau$ is the time constant with a value which assumes one-third of the value of the time interval $t_2-t_3$, and t is the instantaneous value of the time interval $t_2-t_3$.

After the lapse of time t, for the time duration of the dynamic adjustment of the pump delivery beginning, the static adjusting angle of the pump delivery beginning is then adjusted.

Since the electronic components used to achieve the controls in accordance with the present invention are of conventional type, well known to a person skilled in the art, a detailed description thereof is dispensed with herein.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for adjusting the beginning of the pump delivery on a timing device of an injection pump of an air-compressing internal combustion engine for the drive of a vehicle by an electronic control unit which adjusts the beginning of pump delivery by adjusting the timing device in the direction of "advance" or "retard" in dependence on the load condition of the internal combustion engine determined from the operating parameters of internal combustion engine rotational speed, control rack displacement and crankshaft positional signal, comprising the steps of initially adjusting the beginning of pump delivery by a control unit in the direction of retard with a change of an internal combustion engine load present over a predetermined time period from a lower load range into an upper load range, and at a subsequent point in time causing a time-delayed follow-up of the beginning of the pump delivery in the direction of advance to a beginning of the pump delivery coordinated to the changed load condition.

2. A method according to claim 1, wherein the time-delayed follow-up of the beginning of the pump delivery is linear.

3. A method according to claim 1, wherein the course of the time-delayed follow-up can be described by a curve.

4. A method according to claim 3, wherein the curve is an exponential function with the exponent $-t/\tau$, whereby $\tau$ is equal to about one-third of the time interval $t_2-t_3$ and t is the instantaneous value of the time interval $t_2-t_3$.

5. A method according to claim 4, wherein the time-delayed follow-up of the beginning of the pump delivery within an interval of time of $t_2-t_3$ is from about 2 to 30 seconds.

6. A method according to claim 5, wherein the beginning of pump delivery adjusted by the control unit to "retard" remains substantially constant within a first time section of about 10 seconds, while thereupon the beginning of pump delivery corresponding to the changed load condition is adjusted in a second time section corresponding to an exponential function.

7. A method according to claim 1, wherein the time-delayed follow-up of the beginning of the pump delivery within an interval of time of $t_2-t_3$ is from about 2 to 30 seconds.

8. A method according to claim 1, wherein the beginning of pump delivery adjusted by the control unit to "retard" remains substantially constant within a first time section of about 10 seconds, while thereupon the beginning of pump delivery corresponding to the changed load condition is adjusted in a second time section corresponding to an exponential function.

9. An apparatus for adjusting the beginning of a pump delivery in a timing device of an injection pump of an air-compressing internal combustion engine, comprising electronic control means adjusting the beginning of the pump delivery in the direction of "advance" or "retard" in dependence on the load condition of the internal combustion engine determined from the operating parameters including engine rotational speed, control rack displacement and crankshaft position signal, said control means including first means for initially adjusting the beginning of pump delivery in the direction of "retard" with a change of an internal combustion engine load which is present for a predetermined period of time, from a lower load range into an upper load range, and second means for subsequently causing a time-delayed follow-up of the beginning of the pump delivery in the direction of advance to a beginning of the pump delivery coordinated to the changed load condition.

10. An apparatus according to claim 9, wherein the time-delayed follow up of the beginning of the pump delivery takes place within a time interval of about 2 to 30 seconds.

11. An apparatus according to claim 10, wherein the delayed beginning of the pump delivery adjusted by the control means remains constant within a first time section of about 10 seconds and thereupon the beginning of the pump delivery is adjusted in a second time section corresponding to an exponential function to the changed load condition.

12. An apparatus according to claim 9, wherein said second means causes a time-delayed follow up of the beginning of the pump delivery which is linear.

13. An apparatus according to claim 9, wherein the progress of the time-delayed follow-up of said second means follows a curve.

14. An apparatus according to claim 9, wherein the delayed beginning of the pump delivery adjusted by the control means remains constant within a first time section of about 10 seconds and thereupon the beginning of the pump delivery is adjusted in a second time section corresponding to an exponential function to the changed load condition.

* * * * *